(12) United States Patent
Raphael et al.

(10) Patent No.: US 11,210,410 B2
(45) Date of Patent: Dec. 28, 2021

(54) SERVING DATA ASSETS BASED ON SECURITY POLICIES BY APPLYING SPACE-TIME OPTIMIZED INLINE DATA TRANSFORMATIONS

(71) Applicant: International Business Machines Corporation, Armonk, NY (US)

(72) Inventors: Roger C. Raphael, San Jose, CA (US); Hani Talal Jamjoom, Cos Cob, CT (US); Rajesh M. Desai, San Jose, CA (US); Iun Veng Leong, Union City, CA (US); Uttama Shakya, San Jose, CA (US); Arjun Natarajan, Old Tappan, NJ (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 16/573,326

(22) Filed: Sep. 17, 2019

(65) Prior Publication Data
US 2021/0081550 A1 Mar. 18, 2021

(51) Int. Cl.
*G06F 21/60* (2013.01)
*G06F 21/62* (2013.01)

(52) U.S. Cl.
CPC ........ *G06F 21/604* (2013.01); *G06F 21/6209* (2013.01); *G06F 21/6218* (2013.01); *G06F 2221/2141* (2013.01)

(58) Field of Classification Search
CPC . G06F 21/604; G06F 21/6209; G06F 21/6218
See application file for complete search history.

(56) References Cited

U.S. PATENT DOCUMENTS

| 6,044,378 | A | * | 3/2000 | Gladney | ................ G06F 16/94 |
| 8,060,553 | B2 | | 11/2011 | Mamou et al. | |
| 10,268,753 | B2 | | 4/2019 | Bar-or et al. | |

(Continued)

OTHER PUBLICATIONS

Ehrenreich, "System and Method for Automatically Generating Platform-Specific Database Code from Schema composed of Typed Tables and Formulas," An IP.com Prior Art Database Technical Disclosure, IPCOM000255833D, Oct. 16, 2018, 44 pages.

(Continued)

*Primary Examiner* — Vance M Little
(74) *Attorney, Agent, or Firm* — Yee & Associates. P.C.

(57) ABSTRACT

Serving data assets based on security policies is provided. A request to access an asset received from a user having a particular context is evaluated based on a set of asset access enforcement policies. An asset access policy enforcement decision is generated based on evaluating the request. It is determined whether the asset access policy enforcement decision is to transform particular data of the asset prior to allowing access. In response to determining that the asset access policy enforcement decision is to transform the particular data of the asset prior to allowing access, a transformation specification that includes an ordered subset of unit transformations for transforming the particular data of the asset is generated based on the particular context of the user and the set of asset access enforcement policies. A transformed asset is generated by applying the transformation specification to the asset transforming the particular data of the asset.

17 Claims, 8 Drawing Sheets

(56) References Cited

U.S. PATENT DOCUMENTS

| | | | |
|---|---|---|---|
| 10,325,213 | B2 | 6/2019 | Sanchez et al. |
| 10,356,197 | B2 | 7/2019 | Somayazulu et al. |
| 2006/0080553 | A1* | 4/2006 | Hall .................... G06F 21/6227 713/189 |
| 2006/0085841 | A1* | 4/2006 | Chavis .................... G06F 21/31 726/4 |
| 2006/0259954 | A1* | 11/2006 | Patrick ................ G06F 21/6209 726/2 |
| 2013/0144901 | A1* | 6/2013 | Ho ...................... G06F 16/2456 707/769 |
| 2018/0101779 | A1* | 4/2018 | Canim ................... G06N 5/046 |
| 2019/0312869 | A1* | 10/2019 | Han ....................... G06N 5/022 |

OTHER PUBLICATIONS

Anonymous, "System and Method to Predict Data Pattern and Lineage given the System Output and the Black-box Model," An IP.com Prior Art Database Technical Disclosure, IPCOM000258727D, Jun. 88, 2019, 5 pages.

Hellerstein, Ground: Hellerstein et al., "Ground: A Data Context Service," CIDR 2017, Chaminade, California, Jan. 8-11, 2017, 12 pages.

Webjornsen, "Discovering Data Lineage in Data Warehouse: Methods and Techniques for Tracing the Origins of Data in Data-Warehouse," Masters Thesis, University of Oslo, Oslo, Norway, Aug. 2005, 144 pages.

Anonymous, "Product and Usage Discovery based on Data Lineage Analysis," An IP.com Prior Art Database Technical Disclosure, IPCOM000251888D, Dec. 8, 2017, 4 pages.

Reeve, "Managing Data in Motion: Data Integration Best Practice Techniques and Technologies," Elsevier Inc., 2013, 203 pages.

* cited by examiner

SERVING DATA ASSETS BASED ON SECURITY POLICIES BY APPLYING SPACE-TIME OPTIMIZED INLINE DATA TRANSFORMATIONS

BACKGROUND

1. Field

The disclosure relates generally to data security and more specifically to serving data assets based on security policies by applying space-time optimized inline data transformations.

2. Description of the Related Art

A strategy to implement a data lake within an organization, such as, for example, an enterprise or business, would be to curate data sets into a polyglot of technical storage within a protected landing zone and then control access to the data within that data lake based on compliance requirements and regulations. A data lake is usually a single repository of all data for the organization stored in its natural or raw format, usually in files, and includes structured or rectangular data.

A chief data officer of the organization defines data access compliance policies (e.g., rules and regulations). A chief data officer is usually an organization executive responsible for organization wide governance and utilization of data as an asset, via data processing, data analytics, data mining, data distribution, and the like. The chief data officer controls the access to the organization's data by defining the data access compliance policies, such as General Data Protection Regulation policies, Data Loss Prevention policies, Data Protection policies, and the like, for enforcement by a computer system. The computer system captures the chief data officer-defined data access policies as executable rules. Before access to any data asset, the computer system checks the executable rules to determine a data access decision as to whether to allow or deny access to a particular data asset.

The organization's data is moved to the data lake so that data generated from the different sources are available to different organizational users for analytics consummation. For example, sensitive data contained within an asset cannot be copied or moved outside the European Union region or personal information cannot be visible to everyone in a group. In such cases, the chief data officer, who authors the data access policies and executable rules that determine which users get access to which data assets, becomes very important.

SUMMARY

According to one illustrative embodiment, a computer-implemented method for serving data assets based on security policies is provided. A computer evaluates a request to access an asset received from a client device corresponding to a user having a particular context based on a set of asset access enforcement policies corresponding to a particular organization. The computer generates an asset access policy enforcement decision based on evaluating the request to access the asset by the user having the particular context. The computer determines whether the asset access policy enforcement decision is to transform particular data of the asset prior to allowing access. In response to the computer determining that the asset access policy enforcement decision is to transform the particular data of the asset prior to allowing access, the computer generates a transformation specification that includes an ordered subset of unit transformations for transforming the particular data of the asset based on the particular context of the user and the set of asset access enforcement policies. The computer generates a transformed asset by applying the transformation specification to the asset transforming the particular data of the asset. According to other illustrative embodiments, a computer system and computer program product for serving data assets based on security policies are provided.

DETAILED DESCRIPTION

Figure 1:
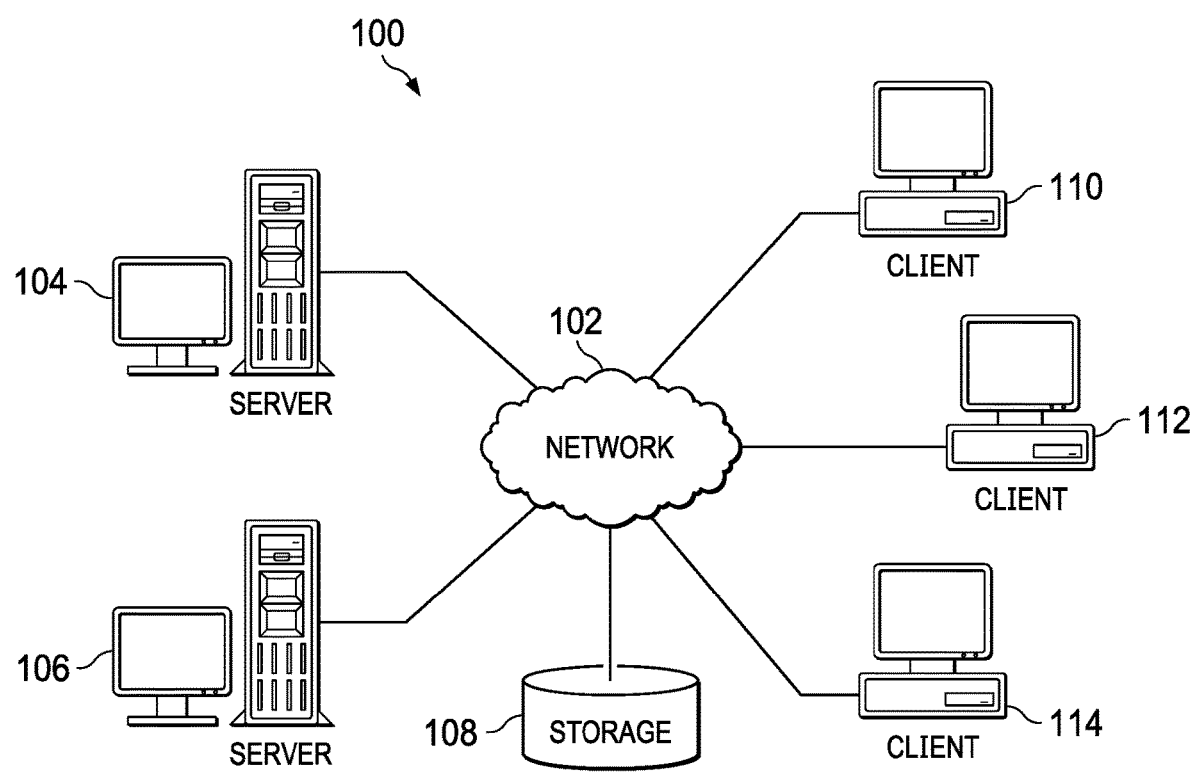
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
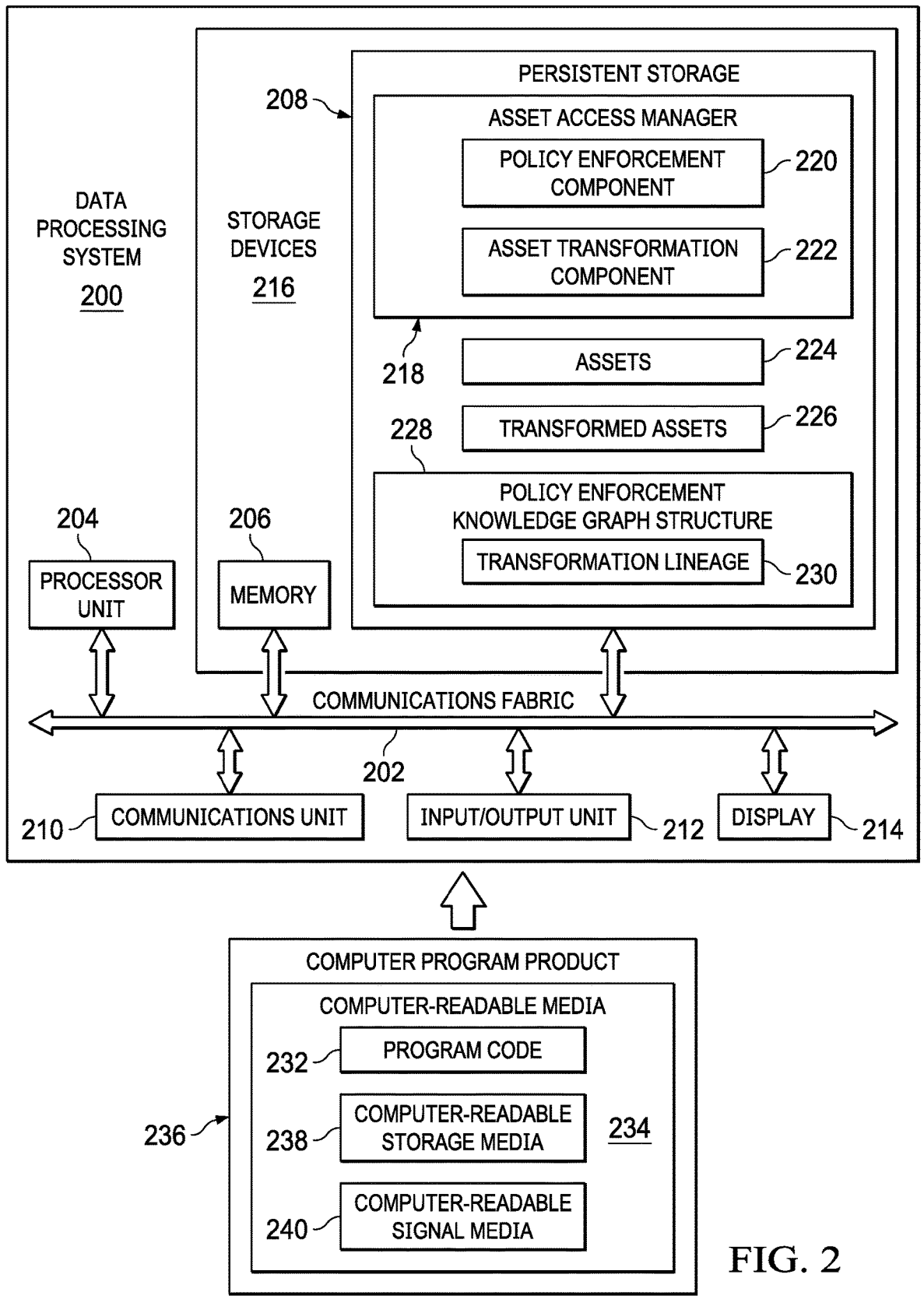
FIG. 2 is a diagram of a data processing system in which illustrative embodiments may be implemented.
Figure 3:
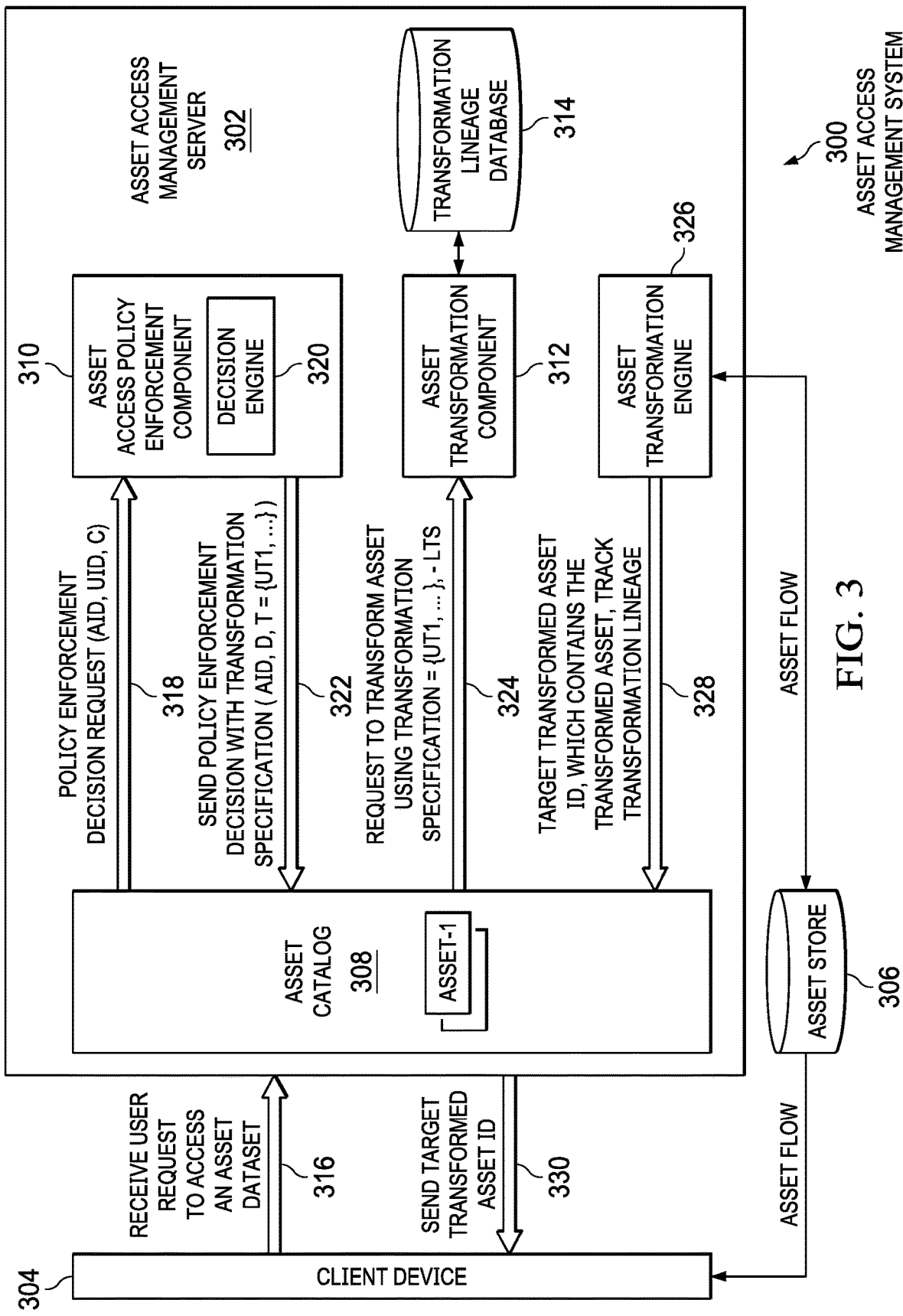
FIG. 3 is a diagram illustrating an asset access management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 may provide data security services for data assets of one or more organizations. For example, server 104 and server 106 may serve data assets containing sensitive data to client devices based on security policies by applying space-time optimized inline transformations to the data assets prior to providing the data assets containing sensitive data to client devices. Also, it should be noted that server 104 and server 106 may each represent a cluster of servers in one or more data centers. Alternatively, server 104 and server 106 may each represent computing nodes in one or more cloud environments.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, kiosks, and the like, with wire or wireless communication links to network 102. Users of clients 110, 112, and 114 may utilize clients 110, 112, and 114 to send data asset access requests to server 104 and server 106.

Storage 108 is a network storage device capable of storing any type of data in a structured format or an unstructured format. In addition, storage 108 may represent a plurality of network storage devices. Further, storage 108 may store a plurality of different data assets, identifiers for the plurality of different data assets, transformed data assets, identifiers for the plurality of transformed assets, policy enforcement knowledge graphs with transformation lineage, identifiers for a plurality of client device users, and the like. Furthermore, storage 108 may store other types of data, such as authentication or credential data that may include user names, passwords, and biometric data associated with system administrators and client device users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard disk drive, a solid-state drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores asset access manager 218. However, it should be noted that even though asset access manager 218 is illustrated as residing in persistent storage 208, in an alternative illustrative embodiment asset access manager 218 may be a separate component of data processing system 200. For example, asset access manager 218 may be a hardware component coupled to communication fabric 202 or a combination of hardware and software components. In another alternative illustrative embodiment, a first set of components of asset access manager 218 may be located in data processing system 200 and a second set of components of asset access manager 218 may be located in a second data processing system, such as, for example, server 106 in FIG. 1.

Asset access manager 218 controls the process of serving data assets, which contain sensitive data, based on security policies by applying space-time optimized inline transformations to the data sets to protect the sensitive data contained in the data sets. In this example, asset access manager 218 comprises policy enforcement component 220 and asset transformation component 222. Asset access manager 218 utilizes policy enforcement component 220 to make security policy enforcement decisions, such as, for example, deny access, allow access, or transform sensitive data prior to allowing access, based on user context of received asset access requests and then implement the security policy enforcement decision. User context depends upon, for example, authorization group membership of the user, time the asset access request was made by the user, login location of the user, and the like. If a security policy enforcement decision is to transform sensitive data prior to allowing access to an asset, then asset access manager 218 utilizes asset transformation component 220 to transform, alter, or change the sensitive data contained in the asset to a different state or form.

Assets 224 represent identifiers for a plurality of different data assets that contain sensitive data, by using data profiling techniques or user tagging the column data or meta information in asset, such as, for example, social security numbers, credit card numbers, bank account numbers, names, addresses, phone numbers, or any other information that may identify or be associated with an individual. An asset may be, for example, a database or a set of databases, a table or a set of tables, a set of data or sets of data, a document or a set of documents, and the like. Transformed assets 226 represent identifiers for a set of assets within assets 224, which are owned and managed by asset transformation component 220, that asset transformation component 220 has previously transformed to protect the sensitive data contained in that set of assets from being accessed or viewed in their original state or form by a user. It should be noted that the actual assets and transformed asset may be stored in a separate storage, such as, for example, storage 108 in FIG. 1.

Asset access manager 218 utilizes policy enforcement knowledge graph structure 228 to efficiently locate and manage the transformed asset that corresponds to a requested asset containing sensitive data. Asset access manager 218 represents assets 224 and transformed assets 226 as nodes within policy enforcement knowledge graph structure 228. In addition, asset access manager 218 generates transformation lineage 230 between nodes within policy enforcement knowledge graph structure 228. In other words, transformation lineage 230 represents an order set of unit transformations from a particular asset to a transformed asset that corresponds to that asset.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 232 is located in a functional form on computer readable media 234 that is selectively removable and may be loaded onto or transferred to data processing system 200 for running by processor unit 204. Program code 232 and computer readable media 234 form computer program product 236. In one example, computer readable media 234 may be computer readable storage media 238 or computer readable signal media 240. Computer readable storage media 238 may include, for example, an optical or magnetic disc that is inserted or placed into a drive or other device that is part of persistent storage 208 for transfer onto a storage device, such as a hard drive, that is part of persistent storage 208. Computer readable storage media 238 also may take the form of a persistent storage, such as a hard drive, a thumb drive, or a flash memory that is connected to data processing system 200. In some instances, computer readable storage media 238 may not be removable from data processing system 200.

Alternatively, program code 232 may be transferred to data processing system 200 using computer readable signal media 240. Computer readable signal media 240 may be, for example, a propagated data signal containing program code 232. For example, computer readable signal media 240 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 232 may be downloaded over a network to persistent storage 208 from another device or data processing system through computer readable signal media 240 for use within data processing system 200. For instance, program code stored in a computer readable storage media in a data processing system may be downloaded over a network from the data processing system to data processing system 200. The data processing system providing program code 232 may be a server computer, a client computer, or some other device capable of storing and transmitting program code 232.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 238 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments provide partial access to data of a given asset. Illustrative embodiments profile the data to understand the type of data present in the asset with its details. Different types of partial access to the data, from highly secure with low utility to less secure with high utility, are hide the presence of data, redact data, anonymize data, data format preserving, data distribution preserving, and the like. The ranked list of access to the partial data inside the asset depends on the usage of the data, then illustrative embodiments make a simple allow or deny decision afterward. This is important to data sharing for analytics application use cases.

If asset access manager 218 cannot implement the transform functions, then the policy enforcement decision may fall back to the more restrictive deny access to the asset. This may include errors during asset transformation. Asset transformation (i.e., partial asset access denied) is further subdivided into the ranked list of access: 1) hide data in the asset, which is very secure and low utility; 2) encode data in the asset, which maintains stability for joins, using, for example, an MD5 checksum or hash; 3) partial redaction of data in the asset, for example, show last four digits of social security and redact the first 5 digits (i.e., xxx-xx-1234); 4) data format preserving for use cases of user interface rendering, such as, for example, U.S. phone number +1(xx)xx-xxxx contained within the asset; and 5) data distribution preserving (e.g., values in age column, values from 0-125 years, follow a distribution for a given asset, which is less secure, but with high utility).

Traditional access control to data, such as just allow or deny, is too restrictive. Illustrative embodiments provide partially allowed access to an asset by a given user/role. Partial asset access corresponding to a given context of a user's request for access to the asset is defined as the user not being allowed to look at a portion of the data in the asset (e.g., for rectangular or tabular data, the user is not allowed to access columns containing "personal information"), but the user may access the rest of the data in the asset.

However, some types of data are useful for referential integrity across different datasets, such as, for example, human resource (HR) records, financial records, medical records, and the like, but the actual values of the data may not be useful for analytical purposes. For example, social security numbers or similar information that identify individuals may provide a key to many datasets, but due to the risk of exposing the actual values of the social security numbers via data leak or the like, it is best to perform a transformation by anonymizing this type of data before using it for analytics. Illustrative embodiments profile assets to obtain details about the types of data present in the assets (e.g., column 5 of rectangular data contains social security numbers or offsets 10-25 of textual data contains personal information). The chief data officer may define a policy or rule, such as, for example, if a tag is labeled "sensitive", then redact the sensitive information (e.g., social security number) or if a tag is labeled "HR", then anonymize the personal information.

From a data security preceptive, a conservative asset access approach is advisable or preferred. From an analytics data consumer preceptive, a broader asset access approach is preferred. For example, presence of a social security number in data may yield restricted access for a specialty administrator or higher-privileged user. However, the social security number may be a key that connects a set of different tables. Redacting the social security number or randomizing it may not be very useful for the analytics user who may be interested in obtaining a single view of the data across the set of different tables (i.e., the asset). Illustrative embodiments transform the sensitive data (i.e., the social security number) by anonymizing the sensitive data across the asset (i.e., the set of different tables) using, for example, a one-way cryptographic key and stabilizing the asset for a particular user in a particular context.

Thus, illustrative embodiments increase data value in a cloud environment by allowing wider access to the data, while at the same time not comprising security of the data. Illustrative embodiments maintain the data in a high utility form by performing just-in-time data transformations in response to received asset access requests from users. Illustrative embodiments manage transformed assets using transformed asset life cycles. For example, an issue with maintaining partial and/or fully transformed assets is that they are stored, require change tracking, and life cycle maintenance. Accessing assets that need to be transformed for privacy is based on defined policies of the corresponding organization.

Illustrative embodiments open access to data of assets for possible analytics usage. If part of the data contains sensitive information, then instead of simply denying access, illustrative embodiments transform the data to open a possibility of giving access to other portions of data present in the asset apart from the sensitive information. In other use-cases, the actual value of the data may be irrelevant to the task at hand, but plays an important secondary role. For example, a tax identification number may be a primary key to multiple tables keeping financial information about employees. Thus, if an analyst wants to get a unified view across all of the tables, the actual value of the tax identification number is not important, but stability of the value across the tables is of importance in order to generate the unified view.

Illustrative embodiments utilize asset transform rules. For example, illustrative embodiments may transform a given asset for a particular context corresponding to the access request by the user. The context corresponding to the access request by the user may depend upon, for example, authorization group membership of the user, time the user made the access request, geographic location of the user's login, and the like. Caching transformed assets in fast memory allows increased responsiveness to user interfaces and applications requesting access to the transformed assets. Transformed assets can be used to construct more restrictive transform assets for a restrictive context. For example, certain contexts are more restrictive than others. For example, a user requesting access to an asset from within the home country of an organization has a certain context, but the same user requesting access to the same asset from a foreign country may have a more restrictive context. Restrictions are defined by the policies.

When transformed assets expire, illustrative embodiments release the storage and delete the transformed assets. A transformed asset expires based on, for example, an input from a user of the transformed asset (e.g., the user sets an expiration date or time for the transformed asset), the transformed asset is no longer actively used (e.g., time to live), the original asset changed enough to force a need for a new transformation, the original asset has reached an end of its life cycle, and the like.

By utilizing transform rules, illustrative embodiments open up the asset data for wider use by users, but at a transformation cost and a compute cost. In addition, in order to increase responsiveness to accessing a transformed asset, the transformed assets can be cached at a storage cost.

Starting with original assets, the compute cost can be optimized by illustrative embodiments using existing or cached transformed assets to construct more restrictive transformed assets. For example, illustrative embodiments may provide ranked access to different roles (e.g., an HR Administrator may be able to read, change, and delete; an HR Editor may be able to read and edit; a senior analytic user may able to read first name, last name, address, and an anonymized SSN; an analytic user may able to read first name, anonymized last name, anonymized address, and anonymized SSN, and the like).

As a use case, after a user requests access to an asset, the policy enforcement engine responds with access denied, but with a transform "action" indicating that further action is needed to gain access to data of the asset. The policy enforcement engine responds with a transformation specification. The enforcement point sends the transformation specification to a transformation component with the original asset. The transformation component responds with a transformed asset by applying the transformation specification. The transformed asset is owned by the transformation component and the life cycle of the transformed asset is managed by the transformation component. Also, illustrative embodiments share the transformed asset as a resource across the user space (e.g., authorized domain).

Security/Privacy-related data transformations of assets takes time and space in a data lake. Illustrative embodiments use a policy enforcement knowledge graph of transformed or partially-transformed assets (i.e., nodes) and unit transformations (i.e., edges between nodes showing relationships) to be able to: 1) reuse transformed and partially-transformed assets; 2) find reuse of wholly-transformed or partially-transformed assets for arbitrary users accessing assets via an asset catalog; and 3) manage the life cycles of transformed and partially-transformed assets.

A decision engine generates ordered subsets of unit transformations by evaluating the chief data officer-defined policies or rules. Illustrative embodiments parse subsets of unit transformations and transformation component traversal occurs to find whole or partial transformed assets derived from previous users' asset access requests. This saves space and computation costs (e.g., time) in attempting to generate a desired net transformation of an asset as imposed by chief data officer policies or rules.

Illustrative embodiments take advantage of the fact that the asset transformations desired by the user space over the data lake asset space is far fewer than the Cartesian product of the asset space times the user space. Over time, the policy enforcement knowledge graph will indicate high reuse of prior partially and/or wholly-transformed assets over the access request arrivals.

Illustrative embodiments find and configure a set of unit transformation in a data protection space for a given organization. This is configured as a set of unique security atomic unit transformations (e.g., UT1, UT2, UT3, . . . UTn). An ordered subset of unit transformations provided for a transformation class corresponding to a decision by the asset access policy enforcement component is expressed as an ordered subset of unit transformations taken from the set of unique security atomic unit transformations. The decision engine has an ontology of the entire set of unique security atomic unit transformations, which may include combined unit transformations as well. However, illustrative embodiments can decompose the set of unique security atomic unit transformations into a subset of unit transformations.

It should be noted that not all asset transformations are filtered, asset transformations can be stateful and can be stop and go (e.g., first tuple out only after last tuple in with or without lookup and state building). The Enforcement Engine responds with an allow, deny, or transform decision on any asset access policy enforcement request consisting of a 3 tuple {A,U,C} (i.e., asset, user, and context). The asset transformation consists of an ordered subset of unit transformations, which comprises the logical transformation specification, which is a JSON form of the ordered subset of unit transformations. Illustrative embodiments decompose the ordered subset of unit transformations based on the ontology of data protection security transformations in the system (i.e., the entire set of unique security atomic unit transformations). For the case where the asset access policy enforcement decision is to deny access, then there is nothing else to do but deny access to the asset and done.

For the case where the asset access policy enforcement decision is to transform the sensitive data contained in the asset with an ordered subset of unit transformations, then illustrative embodiments locate the asset in the policy enforcement knowledge graph. Illustrative embodiments find transformation lineage closure in the policy enforcement knowledge graph rooted at the node corresponding to the asset. Illustrative embodiments traverse the unit transformation edges until the ordered subset of unit transformations terminates at some prior transformed version of the asset, which is still active and alive based on assets' expiration policy, for example, Least Recently Used count.

If found by consuming all unit transformation components as edges from the node corresponding to the asset to a node corresponding to the prior transformed version of the asset, then done. Illustrative embodiments respond with the prior transformed version of the asset so that illustrative embodiments transparently substitute the asset with the prior transformed version of the asset to the calling application and data access framework type. Illustrative embodiments update Least Recently Used counts on the unit transformation edge path leading the terminal node corresponding to the prior transformed version of the asset.

If not found, then illustrative embodiments find a nearest partially-transformed asset to the requested asset. Illustrative embodiments then determine a difference between the ordered subset of unit transformations for the asset and the unit transformation edge path traversed from the asset to the nearest partially-transformed asset to the asset. This is the minimal required unit transformations needed for the current asset access policy enforcement decision. Illustrative embodiments generate a new ordered subset of unit transformations for the asset, which is the difference between the ordered subset of unit transformations for the asset and the unit transformation edge path traversed from the asset to the nearest partially-transformed asset to the asset. Illustrative embodiments submit the new ordered subset of unit transformations to transformation engine for generating a new transformed asset from nearest partially-transformed asset to the asset.

Once complete, illustrative embodiments instantiate a new unit transformation edge path from a node corresponding to the nearest partially-transformed asset to the asset to a node corresponding to the new transformed asset with requisite unit transforms (i.e., the difference between the ordered subset of unit transformations for the asset and the unit transformation edge path traversed from the asset to the nearest partially-transformed asset to the asset) in the policy enforcement knowledge graph. Illustrative embodiments return the new transformed asset to the calling application or user so that illustrative embodiments transparently substitute the new transformed asset to the calling application and data access framework type used by the user. Illustrative embodiments update Least Recently Used counts for the life cycle of the new transformed asset and the unit transform edge path from the node corresponding to the nearest partially-transformed asset to the asset to the node corresponding to the new transformed asset.

Illustrative embodiments utilize a life cycle daemon that isolates all original or base assets that have undergone one or more transformations or have a corresponding transformation lineage. For each original asset, illustrative embodiments traverse all edge paths of transformation lineage and check time to live and reference counts to see if an asset has expired. If an asset has expired, then illustrative embodiments back track necessary unit transform edges to a nearest source asset that has not expired and remove the expired asset, the unit transformation edge path, and any underlying data from the system.

Thus, illustrative embodiments provide one or more technical solutions that overcome a technical problem with allowing a user to access an asset that contains sensitive data. As a result, these one or more technical solutions provide a technical effect and practical application in the field of data security.

With reference now to FIG. 3, a diagram illustrating an example of an asset access management system is depicted in accordance with an illustrative embodiment. Asset access management system 300 may be implemented in a network of data processing systems, such as, for example, network data processing system 100 in FIG. 1. Asset access management system 300 is a system of hardware and software components for serving data assets, which contain sensitive data, based on security policies by applying space-time optimized inline transformations to the data sets to protect the sensitive data contained in the data sets.

In this example, asset access management system 300 includes asset access management server 302, client device 304, and asset store 306. However, it should be noted that asset access management system 300 is only meant as an example and not as a limitation on illustrative embodiments. In other words, asset access management system 300 may include any number of asset access management servers, client devices, asset stores, and other devices not shown. Asset access management server 302 may be, for example, server 104 in FIG. 1 or data processing system 200 in FIG. 2. Client device 304 may be, for example, client 110 in FIG. 1. Asset store 306 may be, for example, storage 108 in FIG. 1.

Asset access management server 302 includes asset catalog 308, asset access policy enforcement component 310, asset transformation component 312, and transformation lineage database 314. Asset catalog 308 includes a listing of all data assets corresponding to the organization, along with their corresponding identifiers. Asset access policy enforcement component 310 and asset transformation component 312 may be, for example, policy enforcement component 220 and asset transformation component 222 in FIG. 2. Transformation lineage database 314 stores a policy enforcement knowledge graph with transformation lineage for the organization. The policy enforcement knowledge graph and transformation lineage may be, for example, policy enforcement knowledge graph structure 228 and transformation lineage 230 in FIG. 2.

At 316, asset access management server 302 receives a user request to access an asset data set from client device 304. Asset access management server 302 looks up the requested asset data set in asset catalog 308. In addition, at 318, asset access management server 302 sends a request, which contains the asset identifier, the user identifier, and the user context, for a policy enforcement decision from asset access policy enforcement component 310. Asset access policy enforcement component 310 utilizes decision engine 320 to generate one of a deny access, allow access, or transform sensitive data prior to allowing access decision, which corresponds to the user access request.

If the decision is to deny the request to access the original asset, but the details contain a transformation specification containing an ordered set of unit transformations, then, at 322, asset access policy enforcement component 310 may request transformation of the original asset with the transformation specification. At 324, asset access policy enforcement component 310 requests that asset transformation component 312 transform the sensitive data within the original requested asset using the transformation specification. Asset transformation component 312 utilizes asset transformation engine 326 to retrieve the requested asset from asset store 306 and transform the sensitive data contained within the original requested asset using information within transformation lineage database 314.

At 328, asset transformation engine 326 generates an identifier for the transformed asset, which contains the transformed asset, and tracks the transformation lineage. At 330, asset access management server 302 sends the identifier of the transformed asset, which contains the transformed asset, to client device 304 for access by client device 304.

Figure 4:
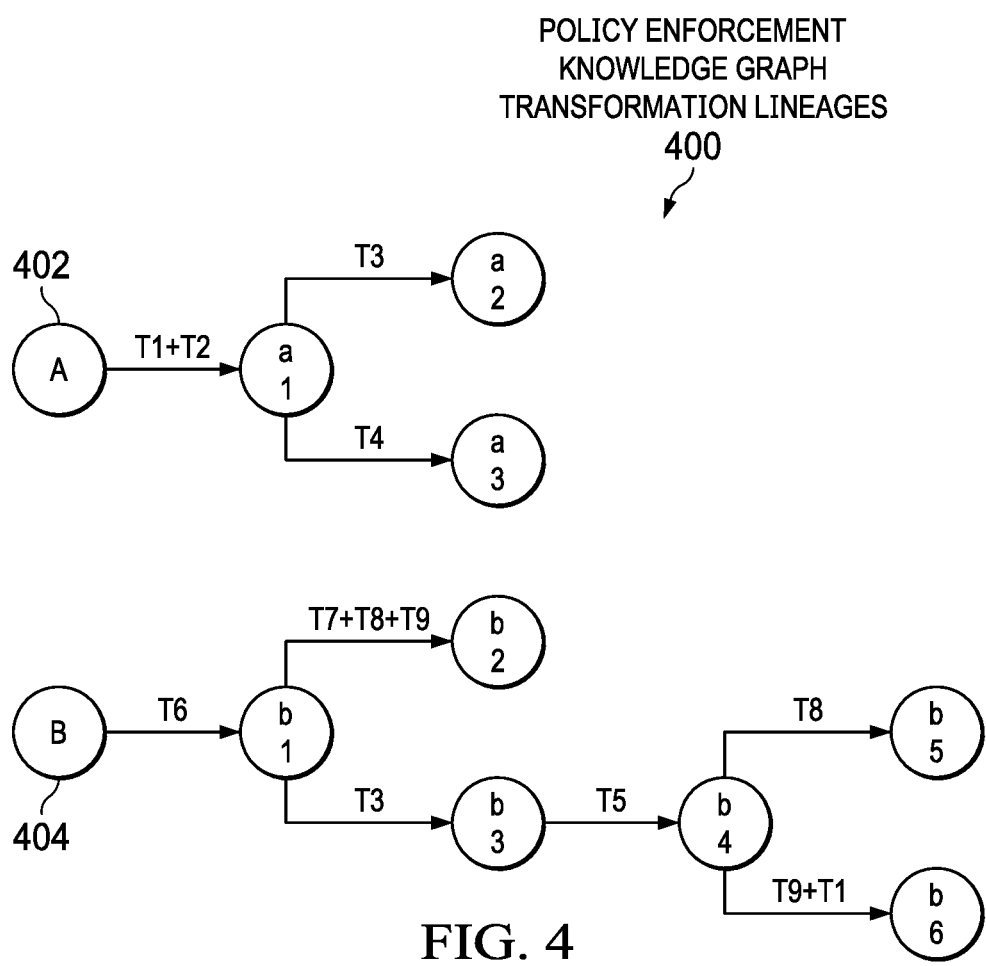
FIG. 4 is a diagram illustrating an example of policy enforcement knowledge graph transformation lineages in accordance with an illustrative embodiment.

With reference now to FIG. 4, a diagram illustrating an example of policy enforcement knowledge graph transformation lineages are depicted in accordance with an illustrative embodiment. Policy enforcement knowledge graph transformation lineages 400 may be stored in a transformation lineage database, such as, for example, transformation lineage database 314 in FIG. 3. In this example, policy enforcement knowledge graph transformation lineages 400 include transformation lineage 402 and transformation lineage 404. However, it should be noted that the transformation lineage database may include any number of transformation lineages.

Transformation lineage 402 illustrates transformation of asset A to transformed asset a1 based on transformation 1 and transformation 2. In addition, transformation lineage 402 illustrates transformation of transformed asset a1 to transformed asset a2 based on transformation 3. Further, transformation lineage 402 illustrates transformation of transformed asset a1 to transformed asset a3 based on transformation 4.

Similarly, transformation lineage 404 illustrates transformation of asset B to transformed asset b1 based on transformation 6. In addition, transformation lineage 404 illustrates transformation of transformed asset b1 to transformed asset b2 based on transformation 7, transformation 8, and transformation 9. Further, transformation lineage 404 illustrates transformation of transformed asset b1 to transformed asset b3 based on transformation 3. Furthermore, transformation lineage 404 illustrates transformation of transformed asset b3 to transformed asset b4 based on transformation 5. Moreover, transformation lineage 404 illustrates transformation of transformed asset b4 to transformed asset b5 based on transformation 8 and transformation of transformed asset b4 to transformed asset b6 based on transformation 9 and transformation 1.

Figure 5A:
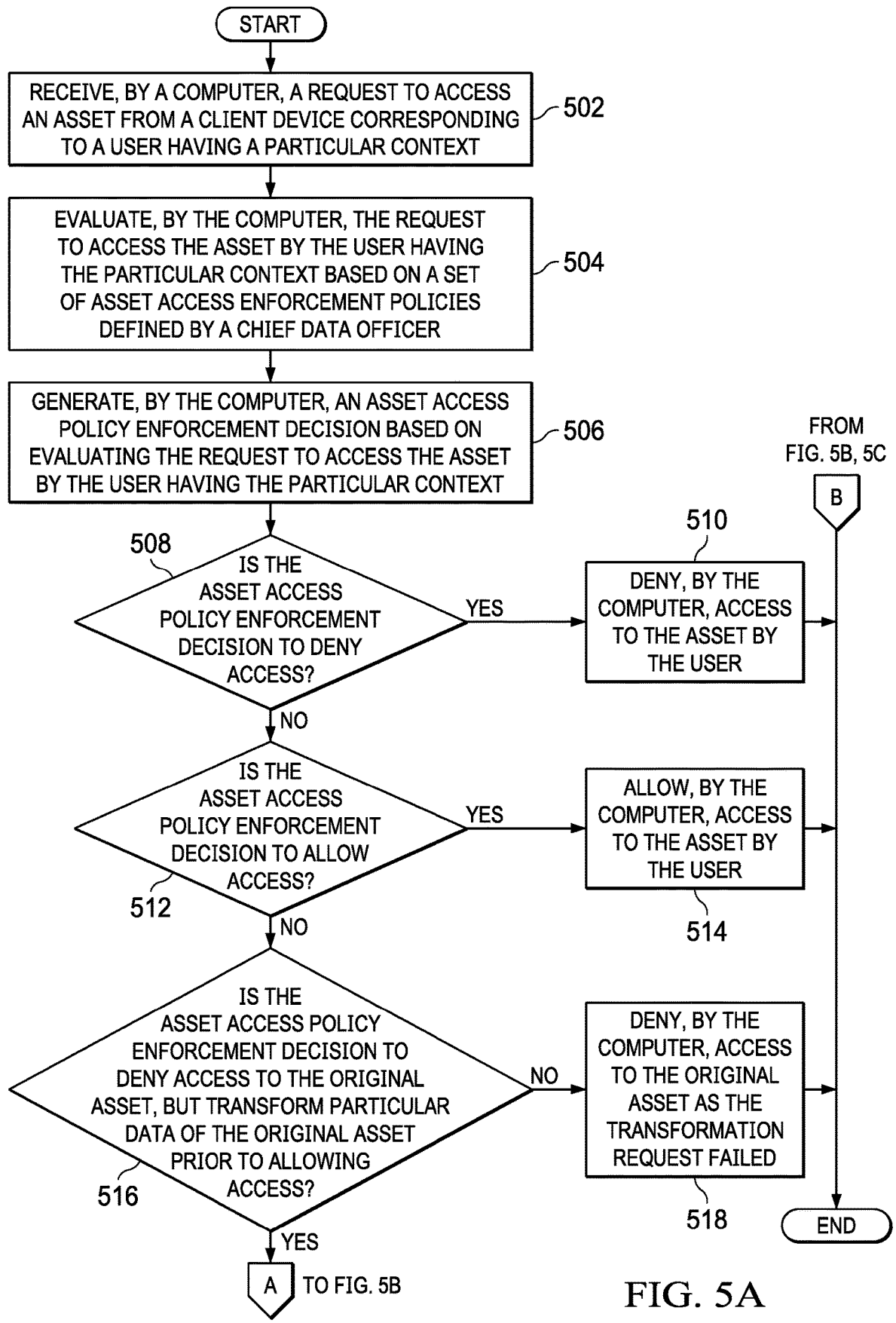
FIGS. 5A-5C are a flowchart illustrating a process for optimizing space-time asset transformations in accordance with an illustrative embodiment.
Figure 5B:
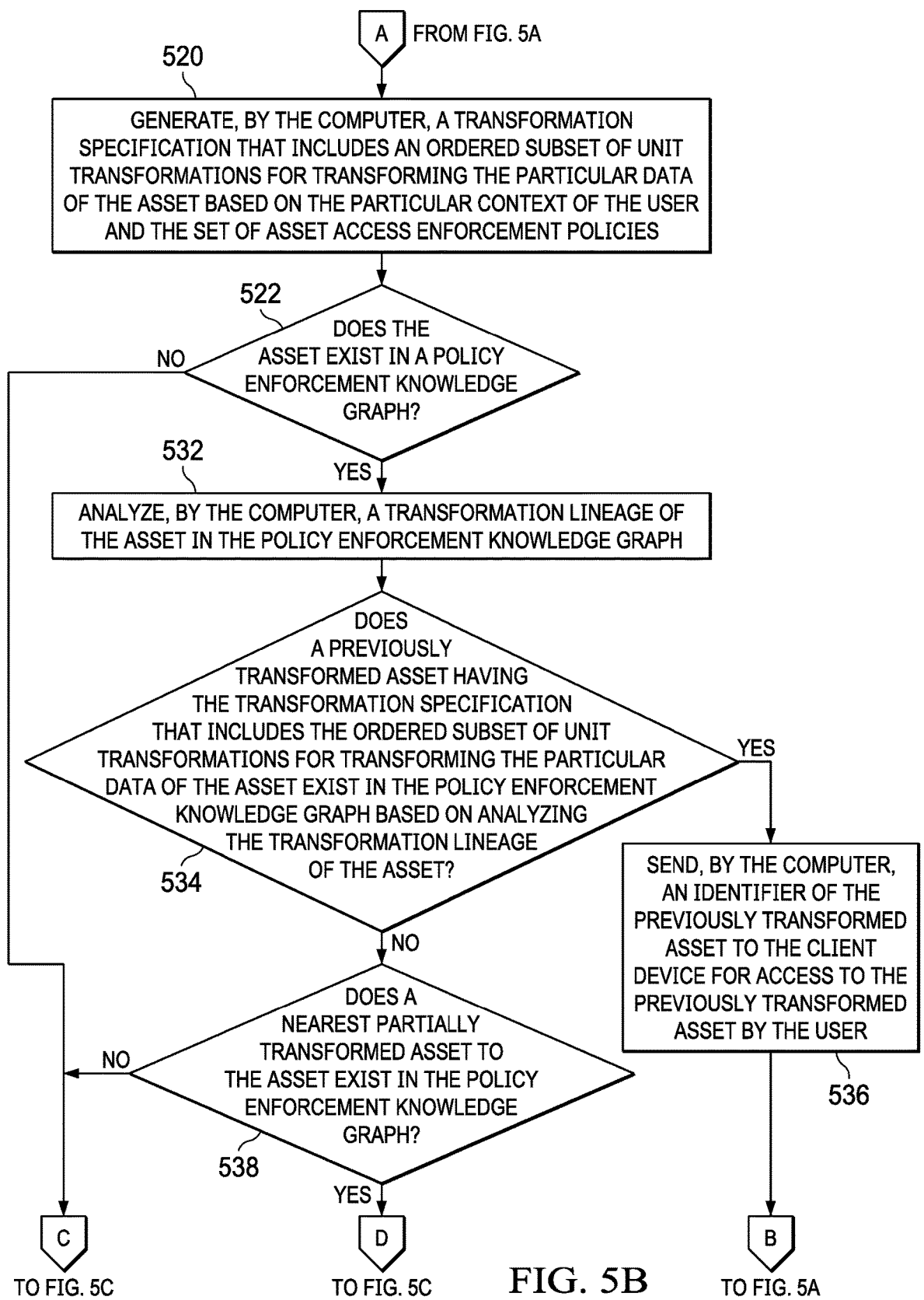
Figure 5C:
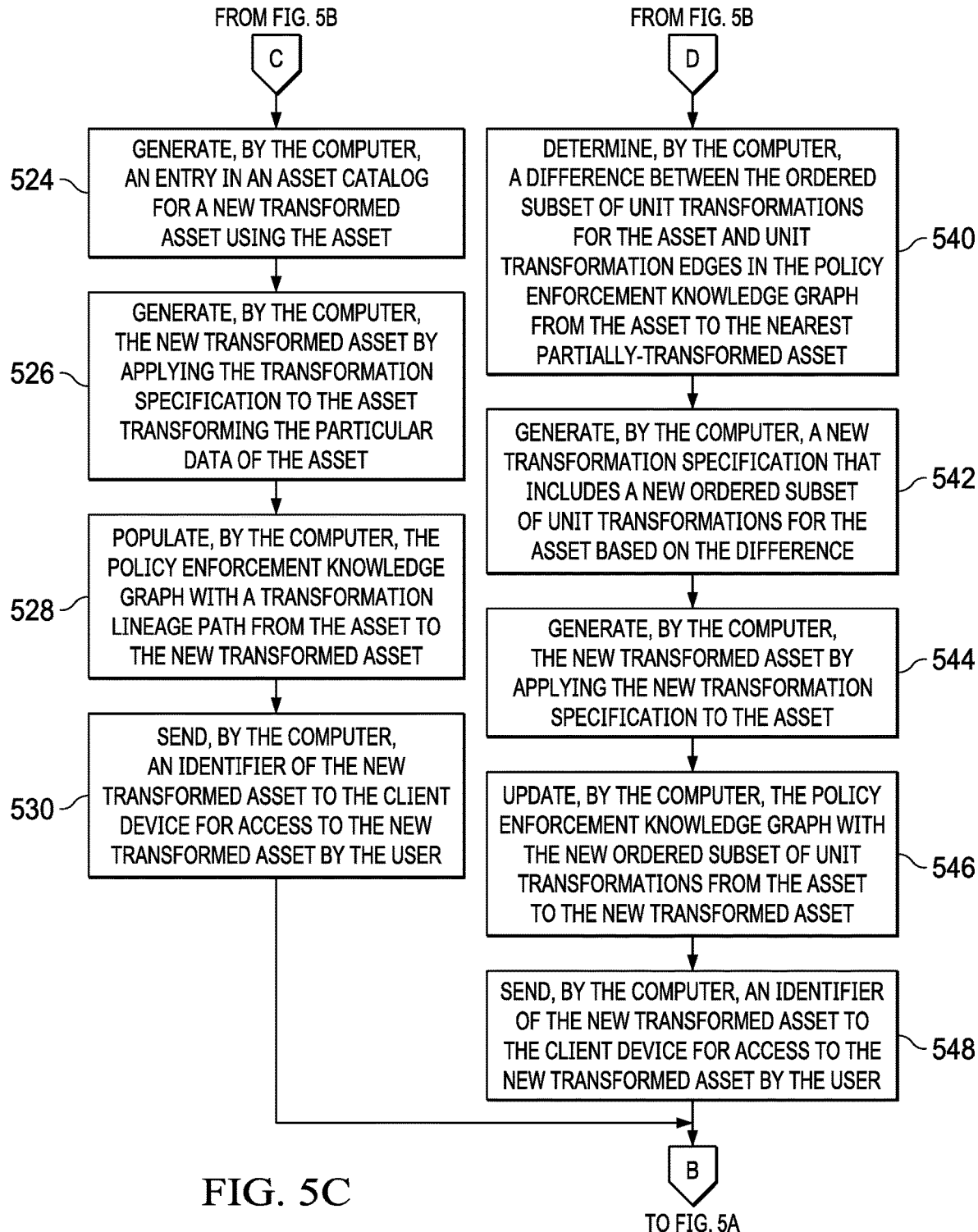

With reference now to FIGS. 5A-5C, a flowchart illustrating a process for optimizing space-time asset transformations is shown in accordance with an illustrative embodiment. The process shown in FIGS. 5A-5C may be implemented in a computer, such as, for example, server 104 in FIG. 1, data processing system 200 in FIG. 2, or asset access management server 302 in FIG. 3.

The process begins when the computer receives a request to access an asset from a client device corresponding to a user having a particular context (step 502). The computer evaluates the request to access the asset by the user having the particular context based on a set of asset access enforcement policies, which are defined by a chief data officer, corresponding to a particular organization (step 504). The computer generates an asset access policy enforcement decision based on evaluating the request to access the asset by the user having the particular context (step 506).

The computer makes a determination as to whether the asset access policy enforcement decision is to deny access (step 508). If the computer determines that the asset access policy enforcement decision is to deny access, yes output of step 508, then the computer denies access to the asset by the user (step 510). Thereafter, the process terminates. If the computer determines that the asset access policy enforcement decision is not to deny access, no output of step 508, then the computer makes a determination as to whether the asset access policy enforcement decision is to allow access (step 512).

If the computer determines that the asset access policy enforcement decision is to allow access, yes output of step 512, then the computer allows the access to the asset by the user (step 514). Thereafter, the process terminates. If the computer determines that the asset access policy enforcement decision is not to allow access, no output of step 512, then the computer makes a determination as to whether the asset access policy enforcement decision is to deny access to the original asset, but transform particular data of the original asset prior to allowing access (step 516).

If the computer determines that the asset access policy enforcement decision is to deny access to the original asset, but not request transformation of the particular data of the original asset, no output of step 516, then the computer denies access to the original asset as the transformation request failed (step 518). Thereafter, the process terminates. If the computer determines that the asset access policy enforcement decision is to deny access to the original asset, but to transform the particular data of the asset prior to allowing access, yes output of step 516, then the computer generates a transformation specification that includes an ordered subset of unit transformations for transforming the particular data of the asset based on the particular context of the user and the set of asset access enforcement policies (step 520).

The computer makes a determination as to whether the asset exists in a policy enforcement knowledge graph corresponding to the particular organization (step 522). If the computer determines that the asset does not exist in the policy enforcement knowledge graph corresponding to the particular organization, no output of step 522, then the computer generates an entry in an asset catalog for a new transformed asset using the asset (step 524). In addition, the computer generates the new transformed asset by applying the transformation specification to the asset transforming the particular data of the asset (step 526).

The computer populates the policy enforcement knowledge graph with a transformation lineage path from the asset to the new transformed asset (step 528). Further, the computer sends an identifier of the new transformed asset to the client device for access to the new transformed asset by the user (step 530). Thereafter, the process terminates.

Returning again to step 522, if the computer determines that the asset does exist in the policy enforcement knowledge graph corresponding to the particular organization, yes output of step 522, then the computer analyzes a transformation lineage of the asset in the policy enforcement knowledge graph (step 532). The computer makes a determination as to whether a previously transformed asset having the transformation specification that includes the ordered subset of unit transformations for transforming the particular data of the asset exists in the policy enforcement knowledge graph based on analyzing the transformation lineage of the asset (step 534).

If the computer determines that a previously transformed asset having the transformation specification that includes the ordered subset of unit transformations for transforming the particular data of the asset does exist in the policy enforcement knowledge graph based on analyzing the transformation lineage of the asset, yes output of step 534, then the computer sends an identifier of the previously transformed asset to the client device for access to the previously transformed asset by the user (step 536). Thereafter, the process terminates. If the computer determines that a previously transformed asset having the transformation specification that includes the ordered subset of unit transformations for transforming the particular data of the asset does not exist in the policy enforcement knowledge graph based on analyzing the transformation lineage of the asset, no output of step 534, then the computer makes a determination as to whether a nearest partially-transformed asset to the asset exists in the policy enforcement knowledge graph (step 538).

If the computer determines that a nearest partially-transformed asset to the asset does not exist in the policy enforcement knowledge graph, no output of step 538, then the process returns to step 524. If the computer determines that a nearest partially-transformed asset to the asset does exist in the policy enforcement knowledge graph, yes output of step 538, then the computer determines a difference between the ordered subset of unit transformations for the asset and unit transformation edges in the policy enforcement knowledge graph from the asset to the nearest partially-transformed asset (step 540).

Afterward, the computer generates a new transformation specification that includes a new ordered subset of unit transformations for the asset based on the difference (step 542). Furthermore, the computer generates the new transformed asset by applying the new transformation specification to the asset transforming the particular data of the asset (step 544). The computer updates the policy enforcement knowledge graph with the new ordered subset of unit transformations from the asset to the new transformed asset (step 546). The computer sends an identifier of the new transformed asset to the client device for access to the new transformed asset by the user (step 548). Thereafter, the process terminates.

Figure 6:
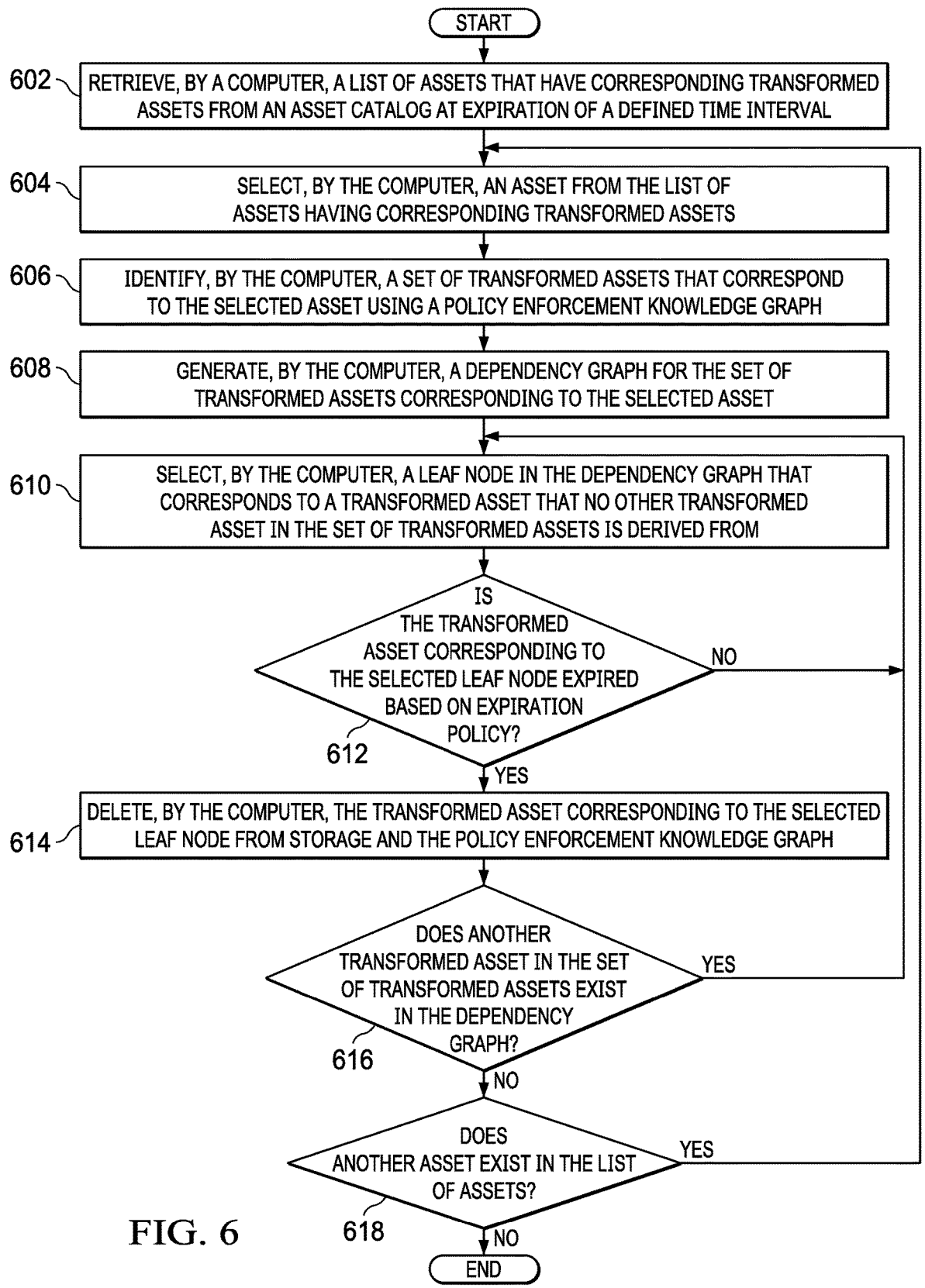
FIG. 6 is a flowchart illustrating a process for managing life cycles of transformed assets in accordance with an illustrative embodiment.

With reference now to FIG. 6, a flowchart illustrating a process for managing life cycles of transformed assets is shown in accordance with an illustrative embodiment. The process shown in FIG. 6 may be implemented in a computer, such as, for example, server 104 in FIG. 1, data processing system 200 in FIG. 2, or asset access management server 302 in FIG. 3.

The process begins when the computer retrieves a list of assets that have corresponding transformed assets from an asset catalog at expiration of a defined time interval (step 602). The computer selects an asset from the list of assets having corresponding transformed assets (step 604). The computer identifies a set of transformed assets that correspond to the selected asset using a policy enforcement knowledge graph (step 606).

The computer generates a dependency graph for the set of transformed assets corresponding to the selected asset (step 608). The computer selects a leaf node in the dependency graph that corresponds to a transformed asset that no other transformed asset in the set of transformed assets is derived from (step 610). The computer makes a determination as to whether the transformed asset corresponding to the selected leaf node expired based on expiration policy (step 612).

If the computer determines that the transformed asset corresponding to the selected leaf node has not expired based on expiration policy, no output of step 612, then the process returns to step 610 where the computer selects another leaf node in the dependency graph. If the computer determines that the transformed asset corresponding to the selected leaf node has expired based on expiration policy, yes output of step 612, then the computer deletes the transformed asset corresponding to the selected leaf node from storage and the policy enforcement knowledge graph (step 614).

Afterward, the computer makes a determination as to whether another transformed asset in the set of transformed assets exists in the dependency graph (step 616). If the computer determines that another transformed asset in the set of transformed assets does exist in the dependency graph, yes output of step 616, then the process returns to step 610 where the computer selects another leaf node in the dependency graph. If the computer determines that another transformed asset in the set of transformed assets does not exist in the dependency graph, no output of step 616, then the computer makes a determination as to whether another asset exists in the list of assets (step 618). If the computer determines that another asset does exist in the list of assets, yes output of step 618, then the process returns to step 604 where the computer selects another asset in the list of assets. If the computer determines that another asset does not exist in the list of assets, no output of step 618, then the process terminates thereafter.

Thus, illustrative embodiments of the present invention provide a computer-implemented method, computer system, and computer program product for serving data assets based on security policies by applying space-time optimized inline data transformations. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for serving data assets based on security policies, the computer-implemented method comprising:
   evaluating, by a computer, a request to access an asset received from a client device corresponding to a user having a particular context based on a set of asset access enforcement policies corresponding to a particular organization;
   generating, by the computer, an asset access policy enforcement decision based on evaluating the request to access the asset by the user having the particular context;
   determining, by the computer, whether the asset access policy enforcement decision is to transform particular data of the asset prior to allowing access;
   responsive to the computer determining that the asset access policy enforcement decision is to transform the particular data of the asset prior to allowing access, generating, by the computer, a transformation specification that includes an ordered subset of unit transformations for transforming the particular data of the asset based on the particular context of the user and the set of asset access enforcement policies;
   generating, by the computer, a transformed asset by applying the transformation specification to the asset transforming the particular data of the asset;
   determining, by the computer, whether the asset exists in a policy enforcement knowledge graph corresponding to the particular organization;
   responsive to the computer determining that the asset does exist in the policy enforcement knowledge graph corresponding to the particular organization, populating, by the computer, the policy enforcement knowledge graph with a transformation lineage path from the asset to the transformed asset; and
   sending, by the computer, an identifier of the transformed asset to the client device for access to the transformed asset by the user.

2. The computer-implemented method of claim 1 further comprising:
   responsive to the computer determining that the asset does not exist in the policy enforcement knowledge graph corresponding to the particular organization, analyzing, by the computer, a transformation lineage of the asset in the policy enforcement knowledge graph;
   determining, by the computer, whether a previously transformed asset having the transformation specification that includes the ordered subset of unit transformations for transforming the particular data of the asset exists in the policy enforcement knowledge graph based on analyzing the transformation lineage of the asset; and
   responsive to the computer determining that a previously transformed asset having the transformation specification that includes the ordered subset of unit transformations for transforming the particular data of the asset does exist in the policy enforcement knowledge graph based on analyzing the transformation lineage of the asset, sending, by the computer, an identifier of the previously transformed asset to the client device for access to the previously transformed asset by the user.

3. The computer-implemented method of claim 2 further comprising:
   responsive to the computer determining that a previously transformed asset having the transformation specification that includes the ordered subset of unit transformations for transforming the particular data of the asset does not exist in the policy enforcement knowledge graph based on analyzing the transformation lineage of the asset, determining, by the computer, whether a nearest partially-transformed asset to the asset exists in the policy enforcement knowledge graph;
   responsive to the computer determining that a nearest partially-transformed asset to the asset does exist in the policy enforcement knowledge graph, determining, by the computer, a difference between the ordered subset of unit transformations for the asset and unit transformation edges in the policy enforcement knowledge graph from the asset to the nearest partially-transformed asset; and
   generating, by the computer, a new transformation specification that includes a new ordered subset of unit transformations for the asset based on the difference.

4. The computer-implemented method of claim 3 further comprising:

generating, by the computer, a new transformed asset by applying the new transformation specification to the asset transforming the particular data of the asset;

updating, by the computer, the policy enforcement knowledge graph with the new ordered subset of unit transformations from the asset to the new transformed asset; and sending, by the computer, an identifier of the new transformed asset to the client device for access to the new transformed asset by the user.

5. The computer-implemented method of claim 1 further comprising:

generating, by the computer, an entry in an asset catalog for the transformed asset.

6. The computer-implemented method of claim 5 further comprising:

retrieving, by the computer, a list of assets that have corresponding transformed assets from the asset catalog at expiration of a defined time interval;

selecting, by the computer, an asset from the list of assets having corresponding transformed assets;

identifying, by the computer, a set of transformed assets that correspond to the selected asset using a policy enforcement knowledge graph of a particular organization; and generating, by the computer, a dependency graph for the set of transformed assets corresponding to the selected asset.

7. The computer-implemented method of claim 6 further comprising:

selecting, by the computer, a leaf node in the dependency graph that corresponds to a transformed asset that no other transformed asset in the set of transformed assets is derived from;

determining, by the computer, whether the transformed asset corresponding to the selected leaf node is expired based on expiration policy; and responsive to the computer determining that the transformed asset corresponding to the selected leaf node is expired based on expiration policy, deleting, by the computer, the transformed asset corresponding to the selected leaf node from storage and the policy enforcement knowledge graph.

8. The computer-implemented method of claim 1, wherein the computer profiles the asset to determine a type of data present in the asset.

9. The computer-implemented method of claim 1, wherein transforming the particular data of the asset is selected from a group consisting of hiding presence of particular data, redacting the particular data, anonymizing the particular data, preserving a format of the particular data, and preserving a distribution of the particular data.

10. The computer-implemented method of claim 1, wherein the computer caches the transformed asset in fast memory allowing increased responsiveness to requests for access to the transformed asset.

11. The computer-implemented method of claim 1, wherein the computer selects the ordered subset of unit transformations for transforming the particular data of the asset from a set of unit transformation in a data protection space for a particular organization.

12. A computer system for serving data assets based on security policies, the computer system comprising:

a bus system;

a storage device connected to the bus system, wherein the storage device stores program instructions; and a processor connected to the bus system, wherein the processor executes the program instructions to:

evaluate a request to access an asset received from a client device corresponding to a user having a particular context based on a set of asset access enforcement policies corresponding to a particular organization;

generate an asset access policy enforcement decision based on evaluating the request to access the asset by the user having the particular context;

determine whether the asset access policy enforcement decision is to transform particular data of the asset prior to allowing access;

generate a transformation specification that includes an ordered subset of unit transformations for transforming the particular data of the asset based on the particular context of the user and the set of asset access enforcement policies in response to determining that the asset access policy enforcement decision is to transform the particular data of the asset prior to allowing access;

generate a transformed asset by applying the transformation specification to the asset transforming the particular data of the asset;

determine whether the asset exists in a policy enforcement knowledge graph corresponding to the particular organization;

populate the policy enforcement knowledge graph with a transformation lineage path from the asset to the transformed asset in response to determining that the asset does exist in the policy enforcement knowledge graph corresponding to the particular organization; and send an identifier of the transformed asset to the client device for access to the transformed asset by the user.

13. The computer system of claim 12, wherein the processor further executes the program instructions to:

analyze a transformation lineage of the asset in the policy enforcement knowledge graph in response to determining that the asset does not exist in the policy enforcement knowledge graph corresponding to the particular organization;

determine whether a previously transformed asset having the transformation specification that includes the ordered subset of unit transformations for transforming the particular data of the asset exists in the policy enforcement knowledge graph based on analyzing the transformation lineage of the asset; and send an identifier of the previously transformed asset to the client device for access to the previously transformed asset by the user in response to determining that a previously transformed asset having the transformation specification that includes the ordered subset of unit transformations for transforming the particular data of the asset does exist in the policy enforcement knowledge graph based on analyzing the transformation lineage of the asset.

14. A computer program product for serving data assets based on security policies, the computer program product comprising a computer readable storage medium having program instructions embodied therewith, the program instructions executable by a computer to cause the computer to perform a method comprising:

evaluating, by the computer, a request to access an asset received from a client device corresponding to a user having a particular context based on a set of asset access enforcement policies corresponding to a particular organization;

generating, by the computer, an asset access policy enforcement decision based on evaluating the request to access the asset by the user having the particular context;

determining, by the computer, whether the asset access policy enforcement decision is to transform particular data of the asset prior to allowing access;

responsive to the computer determining that the asset access policy enforcement decision is to transform the particular data of the asset prior to allowing access, generating, by the computer, a transformation specification that includes an ordered subset of unit transformations for transforming the particular data of the asset based on the particular context of the user and the set of asset access enforcement policies;

generating, by the computer, a transformed asset by applying the transformation specification to the asset transforming the particular data of the asset determining, by the computer, whether the asset exists in a policy enforcement knowledge graph corresponding to the particular organization;

responsive to the computer determining that the asset does exist in the policy enforcement knowledge graph corresponding to the particular organization, populating, by the computer, the policy enforcement knowledge graph with a transformation lineage path from the asset to the transformed asset; and sending, by the computer, an identifier of the transformed asset to the client device for access to the transformed asset by the user.

15. The computer program product of claim 14 further comprising:

responsive to the computer determining that the asset does not exist in the policy enforcement knowledge graph corresponding to the particular organization, analyzing, by the computer, a transformation lineage of the asset in the policy enforcement knowledge graph;

determining, by the computer, whether a previously transformed asset having the transformation specification that includes the ordered subset of unit transformations for transforming the particular data of the asset exists in the policy enforcement knowledge graph based on analyzing the transformation lineage of the asset; and responsive to the computer determining that a previously transformed asset having the transformation specification that includes the ordered subset of unit transformations for transforming the particular data of the asset does exist in the policy enforcement knowledge graph based on analyzing the transformation lineage of the asset, sending, by the computer, an identifier of the previously transformed asset to the client device for access to the previously transformed asset by the user.

16. The computer program product of claim 15 further comprising:

responsive to the computer determining that a previously transformed asset having the transformation specification that includes the ordered subset of unit transformations for transforming the particular data of the asset does not exist in the policy enforcement knowledge graph based on analyzing the transformation lineage of the asset, determining, by the computer, whether a nearest partially-transformed asset to the asset exists in the policy enforcement knowledge graph;

responsive to the computer determining that a nearest partially-transformed asset to the asset does exist in the policy enforcement knowledge graph, determining, by the computer, a difference between the ordered subset of unit transformations for the asset and unit transformation edges in the policy enforcement knowledge graph from the asset to the nearest partially-transformed asset; and generating, by the computer, a new transformation specification that includes a new ordered subset of unit transformations for the asset based on the difference.

17. The computer program product of claim 16 further comprising:

generating, by the computer, a new transformed asset by applying the new transformation specification to the asset transforming the particular data of the asset;

updating, by the computer, the policy enforcement knowledge graph with the new ordered subset of unit transformations from the asset to the new transformed asset; and sending, by the computer, an identifier of the new transformed asset to the client device for access to the new transformed asset by the user.

* * * * *